United States Patent [19]

Rabo et al.

[11] 3,816,341

[45] June 11, 1974

[54] CRYSTALLINE METAL ALUMINOSILICATES HAVING HALIDE AND CERTAIN OTHER SALTS IRREVERSIBLY OCCLUDED THEREIN

[75] Inventors: Jule A. Rabo, Armonk; Marvin L. Poutsma, Ossining; Gary W. Skeels, Jr., Brewster, all of N.Y.

[73] Assignee: Union Carbide Corporation, New York, N.Y.

[22] Filed: Apr. 17, 1972

[21] Appl. No.: 244,853

[52] U.S. Cl............. 252/438, 252/442, 252/455 Z
[51] Int. Cl...... B01j 11/82, B01j 11/78, B01j 11/40
[58] Field of Search................ 252/455 Z, 438, 442

[56] References Cited
UNITED STATES PATENTS 3,497,462 2/1970 Kruerke ........................ 252/455 Z
3,528,768 9/1970 Tucker ........................... 252/455 Z
3,644,220 2/1972 Kearby .......................... 252/455 Z

*Primary Examiner*—C. F. Dees
*Attorney, Agent, or Firm*—William R. Moran

[57] ABSTRACT

A method is provided for irreversibly occluding compositions consisting of salts such as metal halides, nitrates and the like, in crystalline metal aluminosilicates, such as the type X and Y zeolites. The salt doped zeolites are useful in the field of adsorption and catalysis, particularly in areas where these contact materials are employed in an acidic environment or corrosive environment.

18 Claims, No Drawings

CRYSTALLINE METAL ALUMINOSILICATES HAVING HALIDE AND CERTAIN OTHER SALTS IRREVERSIBLY OCCLUDED THEREIN

This invention relates, in general, to crystalline metal aluminosilicates having compositions consisting of salts such as metal halides, nitrates, and the like, irreversibly occluded therein. In one aspect, the invention is directed to a method for irreversibly occluding salts containing halide ions in the X and Y zeolites. In a further aspect, the invention relates to the preparation of salt-occluded zeolites which are particularly useful as catalysts and as adsorbants in acidic or corrosive environments.

Zeolites are crystalline metal (M) aluminosilicates with an open three-dimensional framework of SiO$_4$ and AlO$_4$ tetrahedra. The tetrahedra are crosslinked by oxygen ions, so that the ratio of oxygen atoms to the total of the aluminum and silicon atoms is equal to 2. Their composition is flexible in a sense that the ratio of silicon to aluminum is variable, however, the highest aluminum content is limited to one aluminum per silicon atom. The metal (M) to aluminum ratio is fixed by the chemical relationship between the two. One metal equivalent is necessary to compensate the negative charge on the tetrahedrally coordinated aluminum ion. The chemical balance between the cations and the aluminum can be expressed, as set forth in U.S. Pat. No. 3,230,761, by the formula:

$$2 \text{ Al}/(2 \text{ Na}, 2\text{K}, \text{Ca}, \text{Ba}, \text{Sr}, \text{etc.}) = 1 \pm 0.15.$$

In addition to the metal, aluminum, silicon and oxygen components a certain amount of water is present in the zeolite composition, as it is synthsized.

Under certain conditions, the metal in the zeolite composition can be replaced by other metal cations. For example, the Na cation can usually be replaced in zeolites by other cations through ion exchange method. This results in the replacement of the original Na by an equivalent amount of the new cation. Such ion exchange will by no means change the framework structure and it will only replace the Na by an equivalent amount of the new cation. Cation exchange is normally conducted in a water slurry formed between the zeolite and the solution of a new salt, and the reaction can be represented as follows:

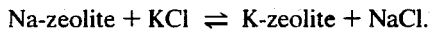

Na-zeolite + KCl ⇌ K-zeolite + NaCl.

During cation exchange the anion of the applied salt will leave with the replaced cation upon washing with water and it does not become part of the zeolite. All chemical analyses carried out with cation exchanged zeolites, forming soluble salt by product, show the absence of the salt anion in the washed cation exchanged zeolite.

There is a large body of literature dealing with the interaction between zeolites and salts. For example, they may come in contact either through the solution of the salt in water or upon submerging the zeolite in salt melt. In the study of the interaction between salt solutions and zeolites, Barrer, "Occlusion of Iodine in Some Porous Crystals Part I — Heat and Energy Relationship" Trans.Far.Soc., 57 1140 (1961), points out that the salt molecules can only enter the large interconnecting channels of zeolites and that these salt molecules do not penetrate the sodalite units, such as those of X, Y and faujasite, either when the salt is applied in solution or through melt.

The structure of the X and Y zeolites consists of sodalite units or cages consisting of 24 Silicon and Aluminum ions and 48 oxygens. The access to the sodalite units is from an intracrystalline and three-dimensional system of cavities through the port formed by six oxygens with a free opening of about 2 A.

Salt occlusions in the large intracrystalline cavities are reversible and the occluded salt can be fully removed by simple washing with water. Salt melt application of halides or nitrates to A zeolite is also reversible and all investigators specifically state that salts do not penetrate the sodalite cage.

Since the occlusion of salts onto small structural units such as a sodalite cage was unsuccessful either by applying the salt in solution or through melt, Barrer attempted to accomplish the salt occlusion into smaller structural units (sodalite cage or cancrinite cage) by synthesizing certain zeolites in the presence of various salts. See R. M. Barrer, "Chemistry of Soil Minerals, Part VI Salt Entrainment by Sodalite and a cancrinite during their Synthesis," J.Chem.Soc. (A), 2735 (1970).

These attempts were successful in the case of certain minerals, for example with cancrinite, which are not zeolites. Following crystallization in the presence of salts, these crystals occluded certain amounts of salt which was manifested by the fact that following extensive washing, chemical analysis and certain x-ray evidence indicated the presence of salt molecules in the structure. These represent the few successful attempts noted in the literature to create an irreversible adduct between non-zeolite minerals and salts. Significantly, no successful irreversible salt occlusion was ever reported with any of the large pore zeolites, such as X, Y, and faujasite in spite of the fact that Barrer pointed out the desirability of salt occlusion in the sodalite cages of the faujasite.

Several patents granted in the United States describe the application of salts, particularly of halides on decationized Y. Decationized Y identifies a product which is obtained either through heat treatment of the NH$_4$ exchanged Y zeolite, or through proton (acid) exchange. In U.S. Pat. No. 3,354,078 metal halides are added to decationized Y to improve catalytic activity. Since metal halides react with acids forming hydrogen halides, they would undoubtedly react with the abundant acidic hydroxyls in decationized Y yielding free hydrogen halides. These acids such as HCl or HF are well known activators in the catalyst prior art. Significantly, no observation was made on the effect of these metal halides on the properties of the metal (M) aluminosilicate form (metal cation form) of the Y zeolite. No observation or claim has been given for irreversible occlusion of the halide in later type zeolite structure (see also U.S. Pat. No. 3,318,802.

In U.S. Pat. No. 3,403,108 the zeolite only serves as an adsorbant and the salt-zeolite system is never exposed either in preparation or in reactions to temperatures above 350° C. According to our own observation no salt occlusion is possible with metal-cation Y under 350° C.

According to U.S. Pat. No. 3,547,831 cation exchange is effected between salts and zeolites upon heat treatment of their mixture (no solution is applied to mixing the salt into the zeolite). It is stated that "after the above described solid base exchange, the crystalline aluminosilicate can be washed with water in order to remove the anionic portion of the metallic salt." Consequently the irreversible occlusion of the anion is disclaimed by this patent. Because of the method of mixing it is unclear how much of the salt will come in chemical contact with the zeolite and what the nature of this chemical reaction is. The only thing that is suggested is the cation exchange between zeolite and the salt.

In U.S. Pat. No. 3,544,650 the ammonium zeolite is heated with halide salts, specifically in solid state. The result is largely similar to the one observed in U.S. Pat. Nos. 3,354,078 and 3,318,803, in that here also a reaction is expected between zeolite hydroxyl and the halide salts, resulting in free acid formation which in turn becomes a well known catalyst activator. In this patent the presence of a noble metal is also required. Therefore, it is not clear whether the catalytic effect of the added halide is the interaction of the halide salt with the zeolite or with the noble metal. It is required, according to this patent, that the salt and the zeolite be mixed in the solid state. This patent indicates that iodide ions are probably occluded in the sodalite cage and it also claims that iodine occlusion is easier than that of other halides, such as the chloride and bromide ions. Examples following the occlusion of iodine are given for ammonium erionite and ammonium T zeolite, while no examples are given for either the X and Y zeolites or for the metal alumino silicate form of the erionite or T zeolite. Since the difference in behavior between different zeolite structures has been well demonstrated by Barrer and others, no conclusion can be derived from the iodine occlusion in erionite and T zeolite to the type X and Y zeolites.

U.S. Pat. No. 2,983,670 is directed to a hydrocracking process wherein the X-type zeolite containing certain promoters is employed. The promoters are added to the zeolite by impregnating the zeolite with certain salts, among which are the transition metal nitrates, and thereafter, due to the unstable nature of the salt, it is easily converted to the desired oxide, sulfide or free metal promoter. Since the salts employed are unstable they are not irreversibly occluded as such, but are converted to the oxide or free metal which enhances hydrocracking activity.

Recently issued U.S. Pat. No. 3,576,901 is similar to U.S. Pat. No. 3,544,650 and relates to a method for the treatment of ammonium derivatives of zeolite compositions with metal salts, such as sodium iodide. However, it is not evident from the disclosure that the ions are irreversibly occluded in the sodalite units. For instance, in example 1 it is indicated that during the process iodine was evolved and only 5.08 weight per cent remained present in the product. In example 2, while 3.0 weight percent iodine was present by analysis, ammonium iodide was driven off when the material was heated. Although this patent may disclose the use of zeolite X, it is only employed in its decationized form. The decationized products of zeolites are, however, different from the crystalline metal aluminosilicate zeolites. (See U.S. Pat. Nos. 2,882,244 and 3,130,007) Hence, due to the structural differences as well as the fact that ammonium iodide can be driven off, it is not evident that any of the originally introduced iodide salt became irreversibly occluded in the cubo-octohetra of the framework.

It has been indicated that zeolite derivatives, the decationized zeolites, employed in referred patents are different in several important ways from crystalline metal aluminosilicates used in the present invention. The "metal" has been replaced either by ammonium or hydrogen ions. The significance of this distinction rests not only on differences in chemical composition but also on the changes introduced upon heat treatment or activation in the structure. When an ammonium zeolite is heat treated (activated) ammonia, and subsequently water, evolves leaving behind a structure deficient in oxygen. The chemical reactivity of this oxygen deficient defect structure is much higher than that of the original crystalline metal aluminosilicate for example, NaY. The structural changes introduced through removal of oxide ions from the crystal structure are not well understood but they are very significant giving rise to substantial changes in the position and the arrangement of both aluminum and some of the oxide ions. Consequently, the penetration of various parts of this structure may become much easier than in the case of structurally regular crystalline, metal aluminosilicates used in the present invention. In certain cases, for example with type X zeolite, the exchange of the metal cation by $NH_4$ or H ion followed by even mild heat treatment leads to the complete loss of the original crystal structure.

Furthermore the reaction between halide salts and decationized zeolites results in H-halide formation, which are strong acids and which are known to react with zeolites with damage or even collapse of the crystal structure. Therefore, no prediction is possible from the properties of decationized products of zeolites to the properties of crystalline metal aluminosilicates in regard to reactions with chemical compounds such as metal halides.

Accordingly, one or more of the following objects will be achieved by the instant invention. It is an object of this invention to provide a method for irreversibly occluding compositions consisting of halide and certain other ions in crystalline metal aluminosilicates. Another object of this invention is to provide a method for irreversibly occluding halides and certain other ions in X and Y zeolites. A still further object is to provide salt occluded zeolites which are particularly useful as adsorbants in acidic environments. These and other objects will readily become apparent to those skilled in the art in the light of the teachings herein set forth.

In its broad aspect, the invention is directed to a method for the irreversible occlusion in metal aluminosilicates, such as the type X and Y zeolites, and faujasite, certain metal salts, as hereinafter defined. The process comprises the steps of:

1. contacting a metal aluminosilicate with a solution comprised of a solvent and the metal salt, 2. evaporating the solvent from the metal aluminosilicate, and 3. heating the metal aluminosilicate salt mixture to a temperature sufficient to irreversibly occlude within the metal aluminosilicate at least some of the salt ions, including the anion, without transformation of the salt from its original chemical composition, and below the temperature at which degradation of the crystalline metal aluminosilicate occurs.

The salt doped zeolites prepared in accordance with the teachings of this invention, possess excellent stability and, as hereinafter indicated possess reduced catalytic activity which renders them particularly useful for various hydrocarbon conversion reactions.

As previously indicated, the occlusion in aluminosilicates, such as X and Y zeolites, or faujasite, is easily accomplished by the application of a concentrated solution of the salt. The situation is quite different with the pores leading to the sodalite cage. Here the aperture through the six-O-ring is 1.7 – 2.5A. This is sufficient for small cations to enter. However, the size of anions is much larger, and in addition, they are repelled by the similarly charged O-ring. For example, the diameter of a chloride ion is almost twice as large as the pore opening, and consequently, the passage of the chloride ion through the six-O-ring is not expected. However, by the process of the present invention, it was unexpectedly found that certain metal salts could be irreversibly occluded to provide metal aluminosilicates of exceptional stability and reduced activity.

In contrast to the prior art, particularly U.S. Pat. No. 2,983,670, the salts occluded by the process of this invention do not undergo a chemical transformation. Both the cation and the anion of the salt are maintained without a change of state. As indicated in that patent, transition metal nitrates are utilized since they easily convert to the desired oxide under the conditions employed therein. However, in the present invention the salts do not undergo a chemical transformation, i.e., nitrate to oxide, but are occluded in the same chemical form as that in which they are introduced.

The metal salts which can be irreversibly occluded in the crystalline metal aluminosilicates by the process of this invention are salts containing a monovalent anion which exists in near neutral pH in solution. As indicated, the salt must also be one which does not undergo chemical transformation and which does not degrade the aluminosilicate structure on removal of the solvent or during the heating step. For example, it has been observed that certain salts, such as the phosphates, are not inert to the aluminosilicates and they will degrade the zeolitic structure under the conditions of this invention.

Illustrative salts which can be employed include, among others, the alkali metal and alkaline earth metal salts, such as sodium bromide, sodium chloride, sodium fluoride, sodium iodide, sodium nitrate, sodium nitrate, sodium chlorate, potassium bromide potassium chloride, potassium nitrite, potassium chlorate, calcium bromide, calcium chloride, calcium fluoride, calcium iodide, calcium nitrate, calcium nitrite, calcium chlorate and the like.

Other suitable metal salts include nickel bromide nickel chloride, nickel iodide, silver bromide, silver chloride, silver fluoride, silver iodide, silver nitrate, silver nitrite, lanthanum bromide, lanthanum chloride, lanthanum iodide, lanthanum nitrate and the like.

As indicated, the metal salts are irreversibly occluded within the metal aluminosilicates by contacting the silicate with a solution of the metal salt, evaporating the solvent and heating the aluminosilicate to a temperature sufficient to cause occlusion, but below the degradation temperature.

The particular solvent employed is not necessarily critical, although in most instances, water is preferred. The solvent, must of course, be one in which the metal salt is soluble and whose molecules can easily enter the pores of the metal aluminosilicate. In addition to water, mixtures of water with alcohols, such as ethanol, ethers, tetrahydrofuran, and the like, can be employed.

In practice, the salt is first dissolved in the solvent and the solution contacted with the aluminosilicate. It is preferred to thoroughly mix the solution containing the salt and aluminosilicate to ensure maximum and uniform dispersion. In most instances, the salt solution is contacted with the aluminosilicate at room temperature. However, temperatures above room temperature may be employed if desired as long as they do not adversely effect the salt or the aluminosilicate.

Thereafter the solvent is evaporated from the aluminosilicate by one or more known techniques. For example, evaporation can be effected at room temperature, by the use of reduced pressure, or at elevated temperatures. Regardless of the method employed, it is preferred that the solution be thoroughly mixed during evaporation of the solvent.

After removal of the solvent, the salt-loaded aluminosilicate is heated to a temperature sufficient to cause irreversible salt occlusion. The temperature, however, must be below the decomposition temperature of the metal aluminosilicate. For example, the type X and Y zeolites are known to decompose at about 800° C to about 900° C. The temperature at which some of the ions commence to enter the sodalite cages will, of course, vary with the particular salt and aluminosilicate. In general, however no irreversible occlusion has been observed at temperatures below about 350° C. It is preferred that the temperature be at least about 550° C.

It is not necessarily critical that the heating step be conducted in an inert atmosphere, as it can equally as well be accomplished in air moreover, pressure is not critical and the process can be conducted at atmospheric or superatmospheric pressures.

In practice it has been found that the amount of salt irreversibly occluded can vary over a broad range. For example, from about 5 percent to about 100 percent of the sodalite units of the zeolites can be filled with the salt anion. Hence, as an upper limit, there would be one anion per sodalite unit. For the lower limit there would be at least about 0.05 anion per sodalite unit.

As hereinbefore indicated, a wide variety of metal aluminosilicates can be doped with salts in accordance with the teachings of this invention. Of particular interest are the type X and Y zeolites. Several of these crystalline metal aluminosilicates which had been doped with salts, particularly alkali metal halide salts, by the methods described herein were found to possess reduced catalytic activity for various hydrocarbon conversion reaction (such as cracking of paraffins and alkylaromatics and isomerization of olefins) compared to the untreated materials. Whereas the usual goal of catalyst modification is to increase activity and selectivity, reduction of activity is useful for materials to be employed as adsorbents to avoid undesirable chemical transformations, to decrease buildup of residues, such as coke formation, and thus to increase adsorbent lifetime. Additionally, the salt doped zeolites of this invention are particularly useful in acidic or corrosive environments.

On the other hand, certain crystalline metal aluminosilicates showed enhancement of catalytic properties after doping with salts, particularly salts having hydrolyzable cations, by the methods described herein.

A further application of the loaded zeolites is in the area of gas separation or absorption. Thus when a transition metal compound containing a cation of low valance state is introduced into the zeolite structure, such cation can effectively interact with oxygen and similar gases which have significant election affinity ($SO_2$, $NO_2$), and contribute to separation from air or other gas mixtures. Illustrative low valance cation-containing salts are ferrous chloride, manganous chloride, cuprous chloride, chromous chloride, cerous chloride and the like.

In the following examples the desired amount of salt was dissolved in an appropriate solvent, the solvent being one whose molecules can easily enter the pores of the aluminosilicate. A preferred solvent is water. The salt solution was then added to the aluminosilicate and the solvent was evaporated. In order to assure the highest degree of salt dispersion in the zeolite, the zeolite-salt slurry is preferentially thoroughly mixed during evaporation of the solvent.

Following evaporation of the solvent, the zeolite salt adduct was heated to the temperature necessary to effect irreversible salt occlusion. Following thermal treatment the zeolite salt adduct may be washed in order to remove the non-occluded salt. Although this washing may not be desirable in some cases, in other cases it is necessary especially when the temperature requirements of the product of this invention, exceed the melting temperature of the added salt.

The following Examples are illustrative:

EXAMPLE 1

100 gm (anhydrous weight) of NaY zeolite were put into a round bottomed flask with 7.5 gm NaCl dissolved in 150cc distilled $H_2O$. The flask was attached to a rotary evaporator and the solvent stripped at 25° C by means of a water asperator attached to the rotary evaporator, Sample 2 in Table I). Following drying, 50 gm of the dry product was put into a tube furnace under air flow and heated to 550° C for 24 hours, cooled and then washed with boiling distilled $H_2O$, until the filtrate of the wash proved negative to a chloride ion test with $AgNO_3$, (Sample 3 in Table I).

Table I

| Chemical Composition | Sample Number | | |
|---|---|---|---|
| | 1 NaY | 2 NaY loaded with NaCl | 3 NaY loaded with NaCl fired in air at 550°C for 24 hours and washed |
| $Na_2O$ wt.% | 12.6 | 14.1 | 13.8 |
| $Al_2O_3$ wt.% | 22.1 | 20.7 | 21.9 |
| $SiO_2$ wt.% | 63.4 | 61.2 | 63.6 |
| Cation Equiv. per framework Al | 0.96 | 1.21 | 1.12 |
| $Cl_2$ wt.% | 0 | 4.1 | 1.7 |
| $Cl^-$/sodalite | 0 | 2 | 0.8 |
| x-ray crystallinity | excellent | excellent | excellent |

EXAMPLE 2

186 gm (anhydrous weight) of CaY zeolite were put into a round bottomed flask with 14 gm NaCl dissolved in 300cc distilled $H_2O$. The flask was attached to a rotary evaporator and the solvent stripped at 25° C by means of a water asperator attached to the rotary evaporator. Following drying, 50 gm of the dry product was washed with cold distilled $H_2O$ until the filtrate of the wash proved negative to a chloride ion test with $AgNO_3$, (Sample 5 in Table II). Another 50 gm of the dry product was put into a tube furnace under an air flow and heated to 550° C for 24 hours, cooled and then washed with boiling distilled $H_2O$ until the filtrate of the wash proved negative to a chloride ion test with $AgNO_3$, (Sample 6 in Table II).

Table II

| Chemical Composition | Sample Number | | |
|---|---|---|---|
| | 4 CaY | 5 CaY loaded with NaCl washed | 6 CaY loaded with NaCl Fired in air 550°C for 24 hours and washed |
| $Na_2O$, wt.% | 1.7 | 3.6 | 4.4 |
| CaO, wt.% | 10.7 | 9.1 | 10.5 |
| $Al_2O_3$, wt.% | 22.6 | 22.5 | 22.0 |
| $SiO_2$, wt.% | 64.1 | 64.3 | 63.0 |
| Cation equiv. per framework Al | 0.99 | 1.00 | 1.18 |
| $Cl_2$, wt.% | 0 | 0 | 2.2 |
| $Cl^-$/sodalite | 0 | 0 | 1.0 |
| x-ray crystallinity | excellent | excellent | excellent |

EXAMPLE 3

100 gm of NaX was loaded with 7 wt. percent NaCl by the method of Examples 1 and heated under air in a tube furnace at 560° C for 24 hours, then washed with boiling distilled $H_2O$ until the filtrate of the wash was free of chloride ion, (Sample 9, in Table III):

Table III

| Chemical Composition | Sample Number | | |
|---|---|---|---|
| | 7 NaX | 8 NaX loaded with 7 wt.% NaCl | 9 NaX loaded with 7 wt.% NaCl fired in air 24 hrs. at 560°C and washed |
| $Na_2O$ wt.% | 19.6 | 19.3 | 20.0 |
| $Al_2O_3$, wt.% | 32.4 | 32.1 | 32.7 |
| $SiO_2$, wt.% | 47.3 | 47.1 | 47.8 |
| Cation equiv. per framework Al | 1.00 | 1.30 | 1.02 |
| $Cl_2$, wt.% | 0 | 4.9 | 1.6 |
| $Cl^-$/sodalite | 0 | 2.4 | 0.8 |
| x-ray crystallinity | excellent | excellent | excellent |

EXAMPLE 4

186 gm (anhydrous weight) of a fresh sample of CaY zeolite were loaded with 7 wt. percent of NaCl as described in Example 2. Following evaporation of the solvent, 25 gm portions of the dried solid were fired in air as set forth in Table IV below, then washed with boiling distilled $H_2O$ until the filtrate of the wash was free of chloride ion, (Samples 11 through 14 of Table IV).

Table IV

| Chemical Composition | Sample Number | | | | |
|---|---|---|---|---|---|
| | 10 CaY loaded with 7 wt.% NaCl | 11 CaY loaded with 7 wt.% NaCl fired in air 24 hrs. at 220°C and washed | 12 CaY loaded with 7 wt.% NaCl fired in air 24 hrs. at 330° C, and washed | 13 CaY loaded with 7 wt.% NaCl fired in air 24 hrs. at 440° C, and washed | 14 CaY loaded with 7 wt.% NaCl fired in air 24 hrs. at 550°C, and washed |
| $Na_2O$ wt.% | 6.02 | 2.5 | 2.9 | 3.2 | 4.5 |
| CaO wt.% | 13.64 | 10.2 | 10.0 | 10.4 | 10.4 |

Table IV—Continued

| Chemical Composition | Sample Number | | | | |
|---|---|---|---|---|---|
| | 10 | 11 | 12 | 13 | 14 |
| | CaY loaded with 7 wt.% NaCl | CaY loaded with 7 wt.% NaCl fired in air 24 hrs. at 220°C and washed | CaY loaded with 7 wt.% NaCl fired in air 24 hrs. at 330° C, and washed | CaY loaded with 7 wt.% NaCl fired in air 24 hrs. at 440° C, and washed | CaY loaded with 7 wt.% NaCl fired in air 24 hrs. at 550°C, and washed |
| $Al_2O_3$ wt.% | 21.12 | 22.3 | 22.2 | 22.2 | 22.0 |
| $SiO_2$ wt.% | 60.56 | 63.4 | 63.0 | 62.8 | 63.0 |
| $Cl_2$ wt.% | 4.68 | 0.04 | 0.08 | 0.64 | 2.23 |
| $Cl^-$/sodalite | 2.23 | 0.02 | 0.04 | 0.29 | 1.02 |
| Cation equivalent per $^{Al}$zeolite | 1.28 | 1.01 | 1.04 | 1.09 | 1.18 |
| X-ray crystallinity | excellent | excellent | excellent | excellent | excellent |

EXAMPLE 5

Separate 100 gm samples of NaY zeolite were prepared, one containing 6.3 wt. percent of NaBr, another containing 15.8 wt. percent NaI, according to the procedure of Example 1. Following evaporation of the solvent, 25 gm portions of the dried solid were fired in air as set forth in Table V, then washed in boiling distilled $H_2O$ until the filtrate of the wash was free of the added anion, (Samples 15–17 in Table V).

EXAMPLE 6

A 5 gm portion of Sample 3, (NaY loaded with NaCl, fired at 550° C, 24 hours in air, and washed) described in Example 1, was subjected to 1 atm steam at 700° C for 1 hour, then washed in boiling distilled $H_2O$, in order to show the irreversilibity of the salt occlusion, even under the vigorous conditions of this test.

Table VI

| Analysis | Sample Number | |
|---|---|---|
| | 3 | 3A |
| | NaY loaded with NaCl described in Example 1 | 3 Sample 3 Steamed and washed |
| $Cl^-$/sodalite | 0.8 | 0.9 |
| Cation equivalent per framework Al | 1.12 ± 0.05 | 1.15 ± 0.05 |
| x-ray crystallinity | excellent | excellent |

X-ray analysis of a NaCl doped and washed CaY zeolite showed that the occluded chloride ions occupied positions near the center of the sodalite cages.

was fired in a tube furnace in air for 64 hours at 550° C then cooled and washed with boiling distilled $H_2O$ until the filtrate of the wash gave a negative test for chloride ion. (Sample 19 of Table VII). 5 gm of Sample 19 were then heated under 1 atm steam for 1 hour at 700° C. (Sample 19A of Table VII).

Table VII

| Analysis | Sample Number | | |
|---|---|---|---|
| | 18 | 19 | 19A |
| | LaY | LaY loaded with NaCl, Fired at 550°C in air, 64 hrs, washed | Sample 19 Steamed and Washed |
| $Cl^-$/sodalite | 0 | 0.35 | 0.22 |
| Cation equivalent per framework Al | 0.96 | 1.16 | 1.19 |
| X-ray crystallinity | excellent | excellent | excellent |

EXAMPLE 8

In order that it can be demonstrated that irreversible salt occlusion can be accomplished with a wide variety of chloride salts a series of samples are given here which by no means is intended to limit the scope of this invention but merely to be used as examples of the invention. These samples were prepared under the procedure described in Example 1 and following the thermal treatment were throughly washed in boiling distilled $H_2O$ until free of chloride ions, then analyzed. The results obtained are set forth in Table VIII.

Table V

| Analysis | Sample Number | | | | | |
|---|---|---|---|---|---|---|
| | 15 | 16 | 17 | 18 | 19 | 20 |
| | NaY loaded with NaBr fired in air 64 hrs. at 550°C, and wash washed | NaY loaded with NaBr fired in air 16 hrs. at 700°C, and washed | NaY loaded with NaBr fired in air 16 hrs. at 785°C, and washed | NaY loaded with NaI fired in air 64 hrs. at 550°C, washed | NaY loaded with NaI fired in air 16 hrs. at 645°C, washed | NaY loaded with NaI fired in air 16 hrs. at 700°C, washed |
| Occluded $Br^-$/sodalite | 0.16 | 0.98 | 0.64 | — | — | — |
| X-ray crystallinity | excellent | excellent | poor* | — | — | — |
| Occluded $I^-$/sodalite | — | — | — | 0.06 | 0.33 | 0.25 |
| X-ray crystallinity | — | — | — | excellent | good | very poor** |

* Melting temperature of NaBr=755°C
* Melting temperature of NaI=651°C

EXAMPLE 7

186 gm (anhydrous weight) of LaY zeolite were loaded with 7 wt. percent NaCl according to the procedure of Example 2. Following drying a 50 gm sample

EXAMPLE 9

100 gm NaY zeolite was loaded with 10 wt. percent of $NaNO_3$ according to the procedure of Example 1, fired in a tube furnace at 550° C for 64 hours, cooled and thoroughly washed in boiling distilled $H_2O$ until free of the nitrate anion, (Sample 21 of Table IX).

Table IX

| Chemical Composition | Sample Number 20 NaY loaded with NaNO₃ | 21 NaY loaded with NaNO₃ Fired in air 64 hrs. at 550°C, washed |
|---|---|---|
| $Na_2O$ wt.% | 15.6 | 13.3 |
| $Al_2O_3$ wt.% | 21.4 | 21.9 |
| $SiO_2$ wt.% | 61.8 | 63.4 |
| $NO_3^-$ as $NaNO_3$ wt.% | 10 | 1.6 |
| Cation equivalent per framework Al | 1.27 | 1.05 |
| $NO_3^-$/sodalite | 2.0 | 0.6 |
| X-ray crystallinity | excellent | excellent |

X-ray crystallographic analysis of the product confirmed the presence of $NO_x$ groups in the sodalite units.

Table VIII

| Zeolite | Added Salt | Heat Treatment T°C | Time, hrs. | Cation Equivalent per $^{Al}$Zeolite | Cl/Sodalite | X-ray Crystallinity |
|---|---|---|---|---|---|---|
| CaY | $CaCl_2$ | 550 | 64 | 1.14 | 0.5 | excellent |
| ZnY | $ZnCl_2$ | 550 | 24 | 1.28 | 0.5 | excellent |
| NaY | $CuCl_2$ | 550 | 48 | 1.12 | 0.8 | excellent |
| NaY | $NiCl_2$ | 550 | 48 | 1.10 | 0.9 | excellent |
| NaY | $LaCl_3$ | 550 | 64 | 1.25 | 0.3 | excellent |
| NaY | $LaCl_3$ | 650 | 24 | 1.24 | 1.0 | excellent |
| NaY | $NaClO_3$ | 650 | 16 | — | 0.9 | excellent |

EXAMPLE 10

In order to demonstrate that irreversible salt occlusion can be accomplished with other nitrate salts, several other samples are given. These samples were prepared under the procedure described in Example 1, and following thermal treatment were thoroughly washed in boiling distilled $H_2O$ until free of nitrate anion, then analyzed, (Sample 22 of Table X).

Table X

| Chemical Composition | Sample Number 22 NaY loaded with $La(NO_3)_3$ fired at 650°C in air 24 hrs, and washed |
|---|---|
| $Na_2O$ wt.% | 5.9 |
| $Al_2O_3$ wt.% | 18.0 |
| $SiO_2$ wt.% | 53.1 |
| wt.% occluded salt* | 2.6 |
| $NO_3^-$/sodalite | 0.5 |
| cation equivalent | 1.69 |
| X-ray crystallinity | excellent |

*Calculated from anion analysis with equivalent cation of added salt

EXAMPLE 11

To show that occlusion of salts gives added structural stability to the zeolite during high temperature thermal treatment, an NaCl occluded NaY (Sample 3 of Table I) was tested vs. a slat-free NaY. The test involved a 16-hour thermal treatment, in air, at a selected temperature. Following thermal treatment, the sample was fully hydrated and the x-ray powder pattern run. The intensities of 5 major diffraction peaks were measured and summed. The temperature of thermal treatment is increased for each new sample. The thermal decomposition point is selected as the temperature at which the sum of the intensities of the 5 peaks is 50 percent of the unfired starting material, the results obtained are set forth in Table XI below:

Table XI

| Sample | Thermal decomposition point |
|---|---|
| Untreated NaY | 760°C. |
| NaCl occluded NaY (Sample 3) | 820°C. |

EXAMPLE 12

In order to show that salt occluded zeolites have better structural stability in acidic media, a sample of $LaCl_3$ occluded NaY prepared in accordance with this invention, and a sample of untreated NaY were leached with 5M $HNO_3$, then tested for x-ray crystallinity, $O_2$ adsorption and $H_2O$ adsorption. The results are set forth in Table XII.

Table XII

ACID STABILITY OF SALT-OCCLUDED ZEOLITES

Removal of Aluminum from the Zeolite with 5M $HNO_3$

| Sample | 5M-$HNO_3$ cc/gm zeolite | % Al Removed | Cation Equiv. Per framework Al | X-ray Crystallinity | $O_2$ Adsorption[1] % of Standard | $H_2O$ Adsorption[2] % of Standard |
|---|---|---|---|---|---|---|
| NaY | 1.3 | 35 | 0.2 | Poor | 5 | 65 |
| NaY-Salt-Occluded with $LaCl_3$ | 1.6 | 35 | 1.0 | Excellent | 82 | 74 |

[1]$O_2$ at 100 MM Hg and −183°C. Standard is non-acid treated starting material.
[2]$H_2O$ at 17.5 MM Hg and 25°C. Standard is non-acid treated starting material.

EXAMPLE 13

In order to demonstrate the reduced catalytic activity of sodium chloride-doped Ca-exchanged Y zeolite for cracking of n-hexane a sample of Ca-exchanged Y zeolite was treated with 7 percent NaCl in an aqueous slurry, stripped of water, and fired at 320° C for 6 hr. and 540° C for 48 hrs. by the general procedure outlined in Example 2. The resulting product was tested for cracking of n-hexane at 500° C and a liquid space velocity of 0.3 hr$^{-1}$. The conversion was 5 percent compared to >75 percent for the untreated Ca-exchanged Y zeolite, each sample having been activated at 550° C for 16 hrs in vacuum before testing.

EXAMPLE 14

In order to demonstrate the reduced catalytic activity of sodium chloride-doped Ca-exchanged and La-exchanged Y zeolites for cracking of cumene, a reaction was carried out at 325° C at a cumene liquid space velocity of 0.1 hr⁻¹ and a 12-fold dilution with nitrogen; all samples were activated at 550° C for 16 hrs in vacuum before testing. The sample of NaCl-doped Ca-exchanged Y zeolite described in Example 13 showed 6.5 percent conversion, based on benzene produced, compared to 91 percent for the untreated Ca-exchanged Y zeolite. After washing this sample with cold water until no further chloride ion was removed, the conversion was reduced even further to 1.8 percent.

A sample of La-exchanged Y zeolite was loaded with 2.5 percent NaCl, dried, and fired at 350°C for 20 hrs and at 550° C for 72 hrs (see Example 7). The cumene conversion was 75 percent compared to >98 percent for the parent La-exchanged Y zeolite.

EXAMPLE 15

In order to demonstrate the reduced catalytic activity of sodium chloride-doped NaY zeolite for double-bond isomerization of 1-butene, a sample of NaY zeolite was loaded with 7 percent NaCl and heated at 550° for 96 hrs (see Example 1). This material was tested for the isomerization of 1-butene to (mixed) 2-butenes by passing a 1:15 mixture (by volume) of 1-butene and nitrogen over the catalyst (contact time of 5 sec) which had been activated at 550° C. The ratios of 1-butene: 2-butene in the product at reaction temperatures of 200° C, 250° C, and 300° C. were 95:5, 92:8, and 85:15, respectively. The parallel ratios for the untreated NaY zeolite were 94:6, 32:68, and 14:82 under identical conditions.

Although the invention has been illustrated by the preceding examples, it is not to be construed as being limited to the materials employed therein, but rather, the invention relates to the generic area as hereinbefore disclosed. Various modifications and embodiments thereof can be made without departing from the spirit and scope thereof.

What is claimed is:

1. A method for the irreversible occlusion of at least one metal salt in crystalline metal aluminosilicates selected from the group consisting of X zeolite, Y zeolite or faujasite, said salt having a monovalent anion, which process comprises the steps of:
   1. contacting said metal aluminosilicate with a solution comprised of a solvent and said metal salt to form a metal aluminosilicate — metal salt mixture;
   2. evaporating said solvent from said mixture; and
   3. heating said mixture to a temperature sufficient to irreversibly occlude within the metal aluminosilicate at least some of the salt ions, including the anion, without transformation of the salt from its original chemical composition, and below the temperature at which degradation of said metal aluminosilicate occurs.

2. The method of claim 1 wherein said metal aluminosilicate is X zeolite.

3. The method of claim 1 wherein said metal aluminosilicate is Y zeolite.

4. The method of claim 1 wherein said metal aluminosilicate is faujasite.

5. The method of claim 1 wherein said metal aluminosilicate — metal salt mixture is heated to a temperature of at least about 350° C.

6. The method of claim 1 wherein said metal aluminosilicate — metal salt mixture is heated to a temperature of at least about 550° C.

7. The method of claim 1 wherein said salt is selected from the group consisting of bromides, chlorides, iodides, fluorides, nitrates and nitrites.

8. The method of claim 1 wherein at least about 0.05 bromide ion is irreversibly occluded per sodalite unit of said metal aluminosilicate.

9. The method of claim 1 wherein at least about 0.05 iodide ion is irreversibly occluded per sodalite unit of said metal aluminosilicate.

10. The method of claim 1 wherein at least about 0.05 chloride ion is irreversibly occluded per sodalite unit of said metal aluminosilicate.

11. The method of claim 1 wherein at least about 0.05 nitrate ion is irreversibly occluded per sodalite unit of said metal aluminosilicate.

12. A metal aluminosilicate selected from the group consisting of X zeolite, Y zeolite or faujasite and having irreversibly occluded therein at least one metal salt having a monovalent anion and being selected from the group consisting of bromides, chlorides, iodides, fluorides, nitrates and nitrites, the ions of which have not undergone a chemical transformation from their non-occluded state.

13. The metal aluminosilicate of claim 12 having irreversibly occluded therein from about 0.05 to about 1 bromide ion per sodalite unit of said metal aluminosilicate.

14. The metal aluminosilicate of claim 12 having irreversibly occluded therein from about 0.05 to about 1 iodide ion per sodalite unit of said metal aluminosilicate.

15. The metal aluminosilicate of claim 12 having irreversibly occluded therein from about 0.05 to about 1 chloride ion per sodalite unit of said metal aluminosilicate.

16. The metal aluminosilicate of claim 12 having irreversibly occluded therein from about 0.05 to about 1 nitrate ion per sodalite unit of said metal aluminosilicate.

17. A catalyst comprised of the metal aluminosilicate of claim 12 and a catalytic amount of a catalytically active component.

18. An adsorbent comprised of the metal aluminosilicate of claim 12.

* * * * *